United States Patent [19]

Kirby

[11] Patent Number: 5,549,498

[45] Date of Patent: Aug. 27, 1996

[54] HIGH SOUND QUALITY GAME CALL

[76] Inventor: Richard C. Kirby, 6426 W. Quaker Rd., Orchard Park, N.Y. 14127

[21] Appl. No.: 308,093

[22] Filed: Sep. 16, 1994

[51] Int. Cl.⁶ ................................................. A63H 3/31
[52] U.S. Cl. ................................................... 446/193
[58] Field of Search ................................. 446/193, 192, 446/188, 180, 176, 197, 203, 207, 209

[56] References Cited

U.S. PATENT DOCUMENTS

| | | | |
|---|---|---|---|
| 1,039,814 | 10/1912 | Sacavem | 446/193 |
| 1,187,838 | 6/1916 | Hughes | 446/188 X |
| 2,755,696 | 7/1956 | Legler | 446/208 X |
| 2,782,558 | 2/1957 | Harley | 446/207 |
| 2,937,473 | 5/1960 | Vlachos | 446/197 X |
| 3,162,440 | 12/1964 | Argiro | 446/193 X |
| 3,813,811 | 6/1974 | Herter | 446/193 |
| 3,900,993 | 8/1975 | Betters | 446/193 |
| 3,968,592 | 7/1976 | Piper | 446/193 |
| 4,048,750 | 9/1977 | Wolfe | 446/193 |

FOREIGN PATENT DOCUMENTS 23158  1/1896  United Kingdom ................ 446/207

Primary Examiner—Robert A. Hafer
Assistant Examiner—D. Neal Muir
Attorney, Agent, or Firm—Hodgson, Russ, Andrews, Woods & Goodyear, LLP

[57] ABSTRACT

A game call for providing a high sound quality. The game call has a weighted undulated bellows to provide adequate air flow to allow three or more pitch generators to be powered for obtaining three or more different sound pitches whereby to obtain a more authentic wild game sound.

20 Claims, 2 Drawing Sheets

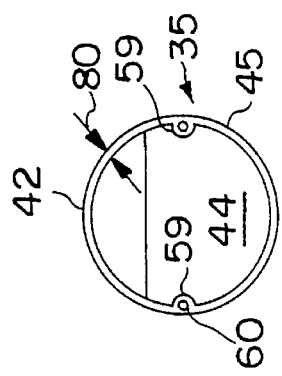
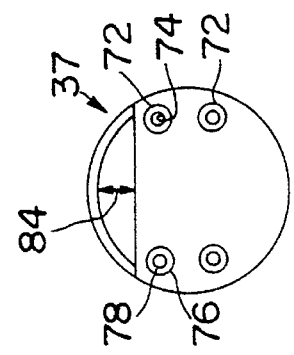
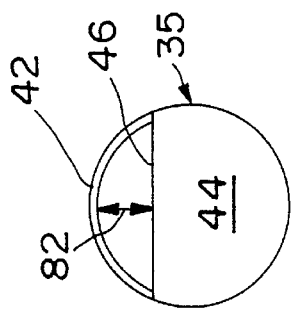
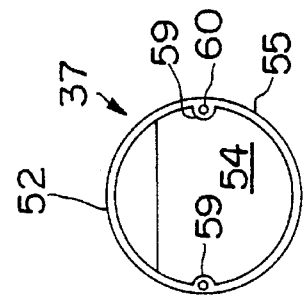
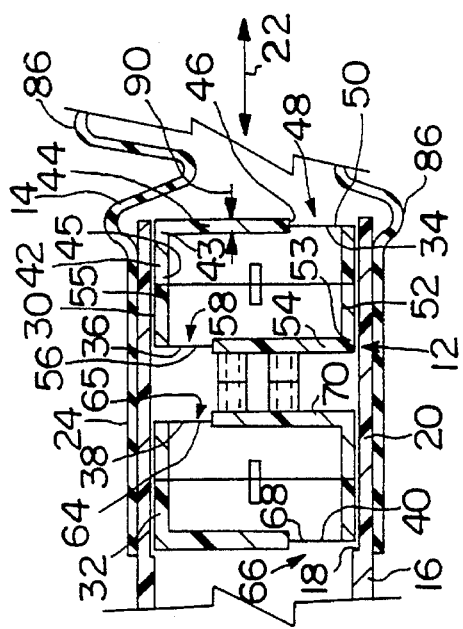
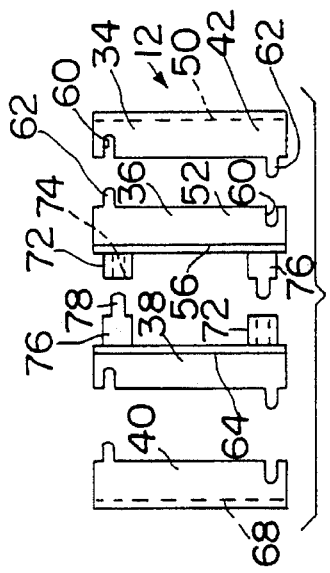

HIGH SOUND QUALITY GAME CALL

The present invention relates generally to game calls such as, for example, wild turkey calls.

One example of a game or wildlife call is that disclosed in U.S. Pat. No. 4,764,145, which issued to Richard C. Kirby, one of the inventors of the present invention. Other examples of game calls are found in U.S. Pat. Nos. 3,900,993; 3,968,592; 4,048,750; 4,483,097; and 4,799,913.

U.S. Pat. Nos. 3,900,993 and 3,968,592 each discloses a game call having a single vibratory reed or diaphragm powered by a tubular flexible bellows having a plurality of corrugations. These patents are incorporated herein by reference for their disclosures relative to the bellows. A two-reed game call having such a corrugated bellows and called a Scotch turkey gobble call is marketed by Scotch Game Call Co. of Elba, N.Y. These corrugated bellows game calls require the use of both hands for operation thereof and are not suitable for use by shaking with one hand. The '993 patent discusses the necessity of adding a weight to the lower free end of the bellows of a prior art device so that it would impart an increased flexing and oblique wobble to the device. Such a bellows may have a tendency to dimple, affecting the appearance, and/or may not be sufficiently sturdy to prevent its striking the user's hand during use by shaking with one hand.

U.S. Pat. Nos. 4,048,750 and 4,799,913, which are also incorporated herein by reference, disclose a hand-operated game call having a two-diaphragm sound chamber, a collapsible generally tubular bellows extending from one end of the chamber with a weight on the end of the bellows, and a hollow handle on the other end of the chamber.

The gobble of a wild turkey is very distinctive and has many pitch or tonal qualities. The effectiveness of a wild turkey call is increased as the sound it produces more closely approximates the actual sound which a wild turkey makes. The diaphragm opening size along with the diaphragm tautness determines the pitch and volume of sound produced by the diaphragm. The above game calls are limited to the production of only one or two distinctive pitch qualities and are also limited in terms of loudness.

Moreover, it is difficult with the straight-walled bellows of the '750 and '913 patents to achieve the quality or quantity of air flow required for the desired higher quality sounds.

It is accordingly an object of the present invention to provide a higher sound quality in a game call.

It is a further object to provide such a game call which may be operated by shaking with a single hand as well as operated by the use of two hands.

It is yet another object of the present invention to provide such a game call which is sufficiently sturdy that it doesn't strike the user's hand during use by shaking with one hand.

It is still another object of the present invention to provide such a game call which has a good appearance.

In order to provide a higher sound quality game call, in accordance with the present invention, the game call is provided with an undulated bellows to provide a quality and/or quantity of air flow for three or more reeds or diaphragms so that the number of distinctive pitches may be increased to produce a sound more authentically like that of the wild game. The bellows is weighted so that it may be operated by shaking with a single hand as well as operated with two hands.

The above and other objects, features, and advantages of the present invention will be apparent in the following detailed description of the preferred embodiment thereof when taken in conjunction with the accompanying drawings wherein the same reference numerals denote the same or similar parts throughout the several views.

BRIEF DESCRIPTION OF THE DRAWINGS

FIG. 2 is an enlarged longitudinal sectional view of the sound chamber therefor.

FIG. 3 is an exploded side view of the sound chamber therefor.

FIGS. 4 and 5 are opposite side or face views of one of two identical members for outer diaphragm assemblies therefor.

FIGS. 6 and 7 are opposite side or face views of one of two identical members for the inner diaphragm assemblies therefor.

DETAILED DESCRIPTION OF THE PREFERRED EMBODIMENT

Figure 8:
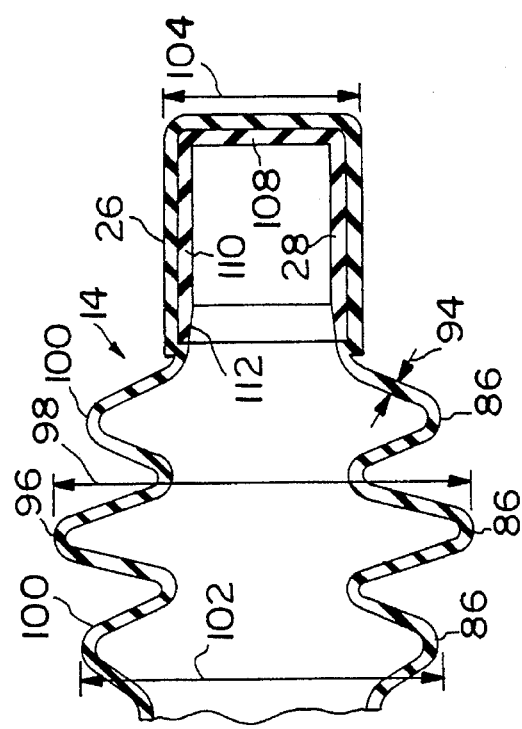
FIG. 8 is a longitudinal sectional view taken along lines 8—8 at FIG. 1 of the bellows therefor.
Figure 1:
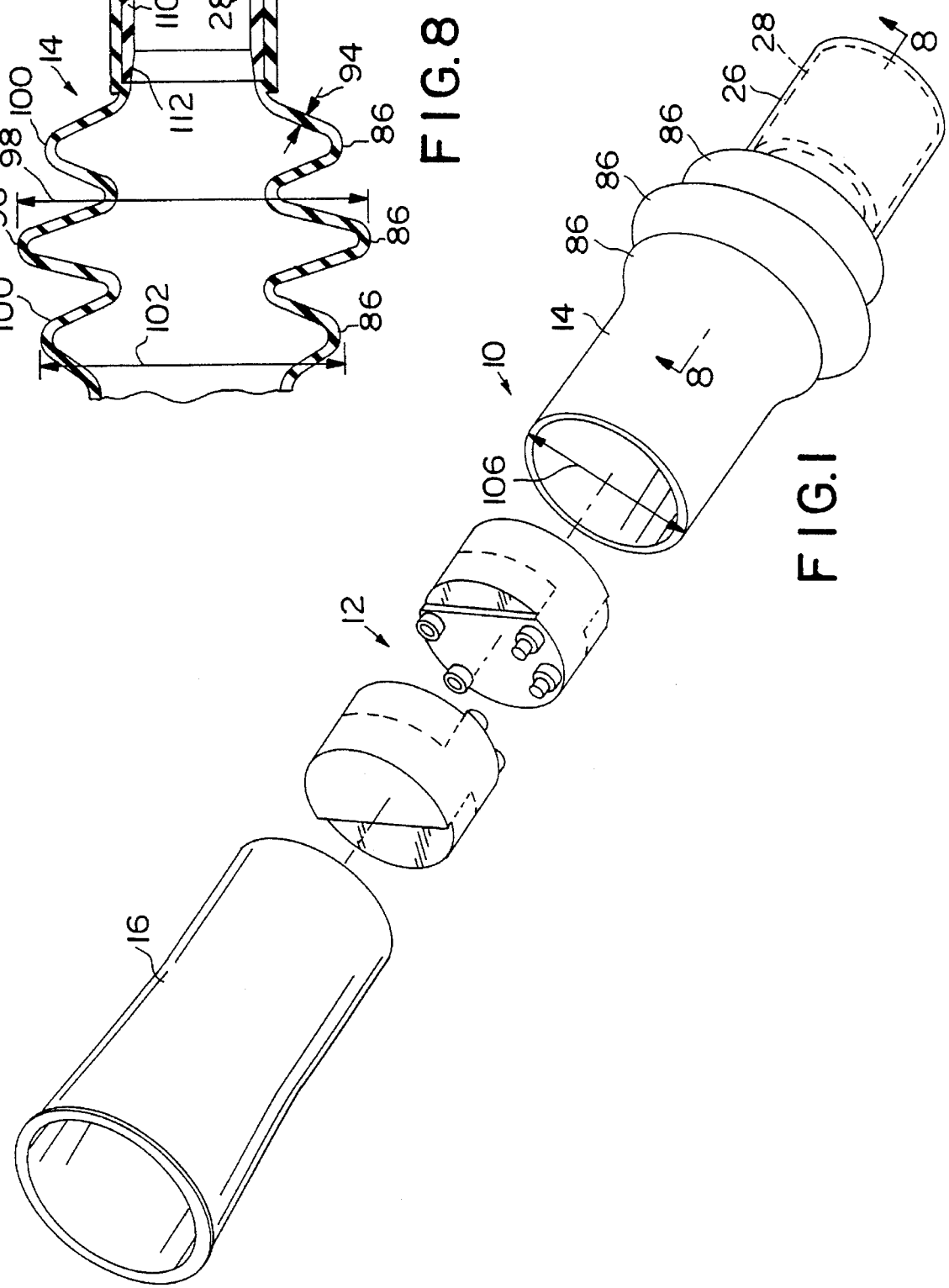
FIG. 1 is a perspective exploded view of a game call which embodies the present invention.

Referring to FIG. 1, there is shown generally at 10 a game call which includes a sound chamber assembly 12, a tubular bellows 14 for forcing air through the sound chamber assembly for generating a sound, and a hollow horn 16, which may be outwardly flared like a megaphone, for amplifying and transmitting, hopefully to a turkey, the generated sound. By moving the bellows to expand and contract the bellows, air is forced back and forth through the sound chamber assembly which is constructed, as hereinafter described, to generate sounds which simulate a wide game sound.

Referring to FIG. 2, the horn 16 is constructed of hard plastic or other suitable durable rigid material, and it has a shoulder, illustrated at 18, on its inner surface providing an increased inner diameter for the end portion 20. The sound chamber assembly 12 is received within the horn end portion 20 with the shoulder 18 acting as a stop to prevent displacement axially of the sound chamber assembly 12. As used herein and in the claims, the terms "axial" and "axially" are meant to refer to direction, as illustrated at 22, along or parallel to the longitudinal axis of the call 10 or otherwise longitudinally of the call 10, and the terms "radial" or "radially" are meant to refer to direction toward or away from the longitudinal axis. The sound chamber assembly 12 is sealingly attached to the inner wall of the horn 16 by friction and may include adhesive or a wedge or by other suitable means.

The bellows 14 is composed of rubber or other suitable elastomeric material, and its end portion 24 is stretched over the end portion 20 of horn 16 and is sealingly attached thereto by friction and may include adhesive or by other suitable means. The other end portion 26 of the bellows 14 is closed, as described hereinafter.

In order to increase the number of distinctive pitch qualities the call can produce for a closer approximation of the sound of a wild turkey or other game, in accordance with the present invention, the sound chamber assembly 12 comprises first and second sounding units 30 and 32 respectively containing at least three and preferably four pitch generators, i.e., first and second pitch generators 34 and 36 respectively for first sounding unit 30 and third and fourth pitch generators 38 and 40 respectively for second sounding unit 32.

First pitch generator 34 comprises a member 35 molded of hard plastic or other suitable material which includes a cylindrical wall portion 42 which engages the inner surface of horn end portion 20 and is sealingly attached thereto by friction and may include adhesive or a wedge or by other suitable means and a solid wall portion 44 of uniform thickness which is integral with and extends radially inwardly from an edge 43 of portion 42 to an edge, illustrated at 46, which defines a chord across the cylindrical portion 42. An opening, illustrated at 48, is defined between the edge 46 and the subtended arc of the cylindrical portion 42. A thin flexible reed or diaphragm 50 composed of rubber latex or other suitable material is attached to the cylindrical portion 42 by two-sided tape or other suitable means and is shaped to close the opening 48. The diaphragm 50 is stretched across the opening 48 and includes a straight edge which is taut against the edge 46. The first pitch generator 34 faces air flow from the bellows 14, and its opening 48 accordingly provides flow communication between the interior of bellows 14 and the interior of the first sounding unit 30. The taut diaphragm 50 vibrates, permitting air to pass through opening 48, upon collapse and expansion of bellows 14, to form a desired sound pitch to combine with sound pitches similarly formed by the other pitch generators to form a distinctive sound.

The second pitch generator 36 comprises a member 37 including a cylindrical wall portion 52, a portion 54 extending radially inwardly from edge 53 of wall portion 52 and integral therewith, an opening 58, and a reed or diaphragm 56 all of which are similar to portions 42 and 44, opening 48, and diaphragm 50 respectively for the first pitch generator, except as discussed hereinafter.

The first and second pitch generators 34 and 36 respectively are in abutting relationship along their circumferential edges 45 and 55 respectively which are axially opposite edges 43 and 53 respectively whereby the diaphragms 50 and 56 are on opposite sides axially of the first sounding unit 30. The openings 48 and 58 are also diametrically opposite each other.

Each of the edges 45 and 55 has molded therein a pair of enlarged portions 59 on diametrically opposed sides thereof along a diameter which is parallel to the respective chord edge, as seen in FIGS. 5 and 6 respectively. A hole, illustrated at 60, in one of the enlarged portions 59 on each of the edges 45 and 55 receives a mating pin 62 molded in the other enlarged portion 59 on the respectively other edge to lockingly connect the first and second pitch generators 34 and 36 respectively to form the first sounding unit 30.

The second sounding unit 32 is similar to the first sounding unit 30 and will therefore not be discussed in detail. The diaphragms 56 and 64 for the second and third pitch generators 36 and 38 respectively are in alignment axially. The opening 66, containing diaphragm 68, to the fourth pitch generator 40 provides flow communication between the interior of the second sounding unit 32 and the horn 16.

The radially extending wall portions 54 and 70 of the second and third pitch generators 36 and 38 respectively each has a pair of formations 72 molded therein and containing holes 74 and a pair of formations 76 molded therein from which extend mating pins 78 molded therein, the holes 74 being at opposite ends of a pair of lines respectively parallel to the respective chordal edge from the pins. The pins 78 of each wall portion 54 and 70 lockingly engage the respective holes 74 in the other of the wall portions 54 and 70 respectively for connecting the first and second sounding units 30 and 32 respectively. The formations 72 and 76 are provided to effect a spacing between the second and third pitch generators 36 and 38 respectively. Flow communication for generation and transmission of sound is thus from the bellows 14 through in sequence the openings 48, 58, 65, and 66 of the first, second, third, and fourth pitch generators respectively, then to the horn 16.

The following example is for exemplary purposes only and not for purposes of limitation. The diameter of the sound chamber assembly 12 may perhaps be about 1.357 inch. The thickness, illustrated at 80, of cylindrical portion 42 of the first pitch generator as well as the cylindrical portions of the other pitch generators may perhaps be about 0.060 inch. The thickness, illustrated at 90, of the uniform thickness radially extending portion 44 as well as the radially extending portions of the other pitch generators may perhaps be about 0.095 inch. The outer or first and fourth pitch generators 34 and 40 respectively have large gap openings wherein the distance, illustrated at 82, perpendicularly from the center of the chordal edge to the subtended arc is perhaps about 0.375 inch to provide a lower frequency sound. The inner or second and third pitch generators 36 and 38 respectively have small gap openings wherein the distance, illustrated at 84, perpendicularly from the center of the chordal edge to the subtended arc is perhaps about 0.281 inch to provide a higher frequency sound. The sound quality may also be regulated by the tautness of the diaphragm in accordance with principles commonly known to those of ordinary skill in the art to which this invention pertains. It should of course be understood that each of the pitch generators may have a different gap size for obtaining four different pitches (three different pitches for a three pitch generator call) so that a more authentic sound of a wild game may be obtained. In any event, the loudness should approximately double over the loudness obtained with a two-diaphragm call.

A straight bellows, as in the '750 and '913 patents, may not allow sufficient air flow for adequately powering a three or more diaphragm call to obtain the desired quality and loudness of sound. In order to provide a sufficient air flow to suitably power the three or more diaphragm call of the present invention, the bellows 14 is constructed to be undulated, i.e., it has a plurality of perhaps three undulations, illustrated at 86, to have a wavy wall pattern between the weight 28 and the portion 24. While not wishing to be bound by theory, it is believed that an undulated bellows may provide, with less movement, a more continuous air flow, i.e., as one part of the undulations closes, another diametrically opposite part opens. The air flow may be quicker or there may be greater air production to obtain the increased quality and loudness of sound.

In order to allow operation conveniently by a hunter of the call by holding the horn in one hand and shaking the call back and forth thereby causing the bellows to swing laterally back and forth, collapsing and expanding alternately, to force air through the sound chamber assembly to generate the desired sound, a suitable weighted article 28 is received within the free end portion 26 of the bellows 14 thereby providing a weighted bellows. As used herein and in the claims, the terms "weight" and "weighted" are meant to refer to weight added to an axially outer or free end portion of a tubular flexible bellows to aid in swinging of the bellows back and forth while holding on to the other end portion of a game call to which the bellows is attached and shaking the game call. The article 28 is hollow and cylindrical in shape, having an end wall 108 and a cylindrical wall 110, and terminates short of the undulations 86. The bellows 14 is preferably molded to the article 28 by placement of the article over the end of a mandrel which is then dipped a number of times as needed to obtain the desired bellows thickness, thereby molding the bellows to the weight 28. The inner wall of the open end portion of the article 28 is tapered slightly outwardly, as illustrated at 112, for ease of molding. The article 28 may of course be otherwise suitably attached. Alternatively, the call may be held in both hands and the bellows reciprocated back and forth for greater control and more volume.

If the wall thickness, illustrated at 94, of the bellows 14 is too little, the undulations may dimple and affect the game call appearance. The bellows may also become floppy, affecting the sound quality. If the wall thickness 94 is too great, more force may be required than desired to operate the game call. In order to provide good sound quality and appearance without requiring excessive force for operation of the game call, the bellows wall thickness 94 is preferably selected to be 0.080±0.0075 inch.

The undulations 86 are provided to be of varying or different sizes in order to further reduce the tendency of the bellows to dimple and to achieve a sturdier bellows so that the bellows does not strike the user's hand during use. Thus, further in accordance with the above example, the middle undulation 96 may have an outer diameter, illustrated at 98, of perhaps about 3.0 inches, and the outer undulations 100 may each have an outer diameter, illustrated at 102, of perhaps about 2.46 inches. The outer bellows diameter, illustrated at 104, in the end portion containing the weighted article may perhaps be about 1.40 inch. The outer diameter, illustrated at 106, of the other end portion of the bellows may perhaps be about 1.72 inch. The distance between the ends of the bellows may perhaps be about 5.5 inches. The article 28 may be composed of hard plastic or other suitable material. The article 28 may extend axially over a distance of perhaps about 1.5 inch. For an entire call weight of perhaps about 5.0 oz., the bellows including the article 28 may weigh perhaps about 3.3 oz., and the article 28 may weigh perhaps about 0.5 oz. It is of course to be understood that the number and sizes of the undulations and the above weights as well as the other exemplary dimensions provided herein may vary and therefore are meant for purposes only of illustration and not for limitation.

Thus, there is provided in accordance with the present invention a game call having a sound chamber assembly which provides a higher quality and louder sound to more closely resemble the sound of a wild game, and means are provided for adequately powering such an improved game call.

It should be understood that, while the present invention has been described in detail herein, the invention can be embodied otherwise without departing from the principles thereof, and such other embodiments are meant to come within the scope of the present invention as defined by the appended claims.

What is claimed is:

1. A game call comprising sound chamber means, horn means in communication with said sound chamber means, and means comprising a bellows in communication with said sound chamber means for forcing air through said sound chamber means, said sound chamber means comprising at least two sounding units each of which has at least one pitch generating means and at least one of which has at least two pitch generating means for generating at least three different sound pitches respectively for thereby generating a sound simulating a sound of a wild game.

2. A game call according to claim 1 wherein each of said pitch generating means has a flexible diaphragm means.

3. A game call according to claim 2 wherein said bellows is characterized by having a plurality of undulations.

4. A game call according to claim 1 comprising at least four of said pitch generating means.

5. A game call according to claim 1 wherein said bellows means comprises a flexible weighted tube characterized by having a plurality of undulations.

6. A game call according to claim 5 wherein said undulations have varying diameters.

7. A game call comprising sound chamber means, horn means in communication with said sound chamber means, and means comprising a bellows having an end portion in communication with said sound chamber means and having a free end portion and having a plurality of undulations for forcing air through said sound chamber means, said sound chamber means comprising means including at least three pitch generating means each of which has a flexible diaphragm means for generating at least three different sound pitches respectively for thereby generating a sound simulating a sound of a wild game.

8. A game call according to claim 7 comprising at least four of said pitch generating means.

9. A game call according to claim 8 wherein said sound chamber means includes a first sound chamber defined by two of said wall which are exially spaced, a second sound chamber defined by two other of said wall which are axially spaced, and means for spacing axially said first and second sound chambers.

10. A game call according to claim 7 wherein said bellows means comprises a flexible weighted tube characterized by having a plurality of undulations.

11. A game call according to claim 10 wherein said undulations have varying diameters.

12. A game call comprising sound chamber means, horn means in communication with said sound chamber means, means comprising a bellows having an end portion in communication with said sound chamber means and having a free end portion and having a plurality of undulations for forcing air through said sound chamber means, and means for weighting said free end portion of said bellows, said sound chamber means comprising at least three pitch generating means each of which has flexible diaphragm means for generating at least three different sound pitches respectively for thereby generating a sound simulating a sound of a wild game, and said bellows characterized by said undulations having varying diameters.

13. A game call according to claim 12 comprising at least four of said pitch generating means.

14. A game call according to claim 12 wherein said at least one pitch generating means comprises a wall having opening means to thereby allow air flow through said sound chamber means between said bellows means and said horn means, a flexible diaphragm means for closing said opening means, said flexible diaphragm means having means defining a taut edge which is flexible for permitting movement of air through said opening means.

15. A game call according to claim 12 comprising three of said undulations including a central undulation which has a diameter which is greater than the diameter of the others of said undulations.

16. A game call comprising sound chamber means, horn means in communication with said sound chamber means, means comprising an undulated bellows for forcing air through said sound chamber means, said bellows having an end portion in communication with said sound chamber means and a free end portion, and means for weighting said free end portion of said bellows, said sound chamber means comprising at least three axially-spaced walls each of which includes opening means to thereby allow air flow through said sound chamber means from said bellows means to said horn means, and a flexible diaphragm means for closing each said opening means, each said flexible diaphragm means having means defining a taut edge which is flexible for permitting movement of air through said respective opening means for generating at least three different sound pitches respectively for thereby generating a sound simulating a sound of a wild game.

17. A game call according to claim 16 comprising at least four of said walls.

18. A game call according to claim 17 wherein said sound chamber means includes a first sound chamber defined by two of said walls, a second sound chamber defined by two other of said walls, and means for spacing axially said first and second sound chambers.

19. A game call according to claim 18 wherein said bellows means has a plurality of undulations of varying diameters.

20. A game call according to claim 16 wherein said bellows means has a plurality of undulations of varying diameters.

* * * * *